United States Patent

[11] 3,524,431

| [72] | Inventors | Walter Robert Graham<br>Kalamazoo, Michigan;<br>William Bradley Reid, Kalamazoo, Michigan |
|---|---|---|
| [21] | Appl. No. | 702,275 |
| [22] | Filed | Feb. 1, 1968 |
| [45] | Patented | Aug. 18, 1970 |
| [73] | Assignee | The Upjohn Company<br>Kalamazoo, Michigan<br>a Corp. of Delaware |

[54] ANIMAL SHIPPING CAGES
5 Claims, 4 Drawing Figs.

| [52] | U.S. Cl. | 119/19, 229/6 |
|---|---|---|
| [51] | Int. Cl. | A01k 31/18 |
| [50] | Field of Search | 119/19, 15; 229/6, 32 |

[56] References Cited
UNITED STATES PATENTS

| 1,714,295 | 5/1929 | Bomberger | 229/6 |
|---|---|---|---|
| 2,979,250 | 4/1961 | Hobbs | 229/32 |
| 2,988,044 | 6/1961 | Adelberg et al. | 119/19X |
| 3,122,127 | 2/1964 | Shechmeister et al. | 119/19X |
| 3,306,258 | 2/1967 | Hunt | 119/19 |
| 3,401,671 | 9/1968 | Axelrod et al. | 119/3X |
| 3,413,958 | 12/1968 | Artig | 119/15 |

Primary Examiner— Aldrich F. Medbery
Attorney—Woodhams, Blanchard and Flynn and Eugene O. Retter and Taliwaldis Cepuritis ABSTRACT: An enclosure structure having plural, superimposed compartments formed from a plurality of substantially identical, thin-walled containers having recessed bottom walls which permit transverse stacking of the containers in positions opposing relative, lateral movement. Each container has a perforate cover sheet secured to the flanged upper edges of the side and end walls of the containers, which are capable of substantially complete nesting for economical shipment.

Patented Aug. 18, 1970

3,524,431

INVENTORS
WALTER ROBERT GRAHAM
WILLIAM BRADLEY REID
BY
Woodham, Blanchard & Flynn
ATTORNEYS 3,524,431

ANIMAL SHIPPING CAGES

BACKGROUND OF THE INVENTION

This invention relates in general to an enclosure structure and a method for shipping a plurality of small animals and, more particularly, to a structure comprised of a plurality of low cost enclosures designed so that they can be stacked in an interlocking condition when being used to ship animals and can be nested almost completely when being shipped empty.

Persons familiar with the shipping of small animals, such as rodents used in laboratory tests, are fully aware that existing animal enclosures for this purpose are not satisfactory for many reasons. By way of example, previous enclosures have been costly, or heavy, or fragile, or have provided inadequate light and/or ventilation, or have been difficult to handle, particularly where they have been stacked or otherwise crowded closely together in large numbers for the purpose of shipping a large number of animals.

As a result, it has often been necessary for persons shipping small animals in large quantities to include a substantial charge for the shipping containers, and the animals have been known to die in transit for lack of adequate ventilation or as a result of injuries received when a sudden movement has caused the containers to shift and collapse or fall.

In some cases, enclosures designed to overcome some of the foregoing problems have permitted the animals to escape or, at least, have created the further problem of recovering the animals.

Accordingly, a primary object of this invention is the provision of an expendable, lightweight, well-ventilated and sturdy enclosure construction for shipping a plurality of small animals safely and economically in a manner permitting quick and easy loading and unloading while at least minimizing the opportunities of injury and/or suffering for the animals being shipped.

A further object of this invention is the provision of animal shipping enclosures which can be gas-sterilized readily.

A further object of this invention is the provision of a method for shipping small animals, whereby the problems presently encountered in effecting such shipments are avoided.

Other objects and purposes of this invention will become apparent to persons familiar with this type of equipment upon reading the following descriptive material and examining the accompanying drawings, in which.

Figure 1:
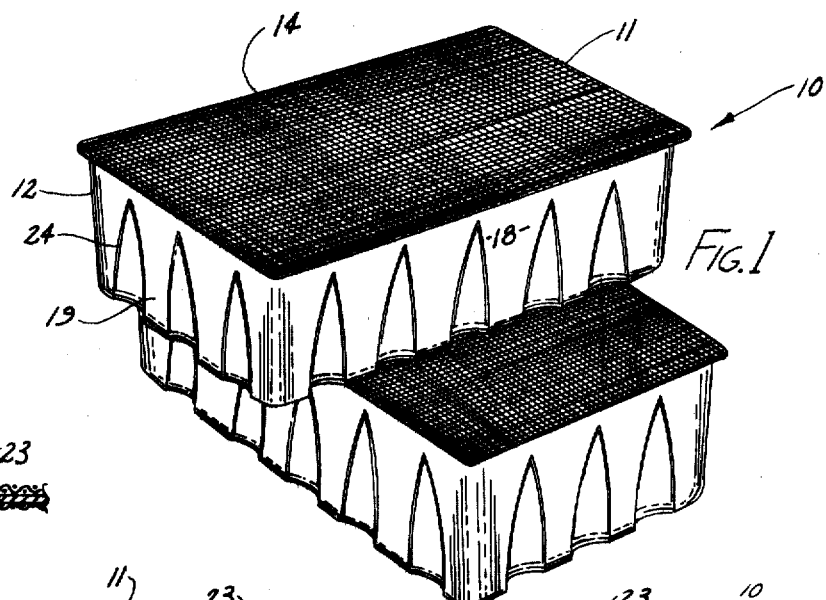
FIGURE 1 is a perspective view of an enclosure structure embodying the invention.
Figure 4:
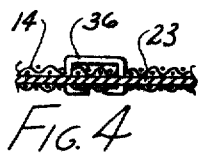
FIGURE 4 is a sectional view taken along the line IV-IV in FIGURE 2.

For convenience in description, the terms "upper," "lower" and words of similar import will have reference to the enclosure structure of the invention as appearing in FIGURE 1. The terms "inner," "outer" and derivatives thereof will have reference to the geometric center of one compartment of said enclosure structure and parts thereof.

SUMMARY OF THE INVENTION

The objects and purposes of the invention, including those set forth above, have been met by providing an enclosure structure having plural, superimposed compartments formed from a plurality of substantially identical, elongated and upwardly opening containers having flanged openings. The bottom wall of each container has downwardly offset end portions spaced from each other a distance approximately equal to the width of the flanged upper edge of the container so that one container can be supported transversely upon another container in an interlocked position. Each container is covered by a perforate sheet removably fastened to the flange on the container at intervals therealong.

DETAILED DESCRIPTION

The animal enclosure structure 10, which illustrates one preferred embodiment of the invention, is comprised of a plurality of elongated enclosure units 11, each of which is comprised of a one-piece, plastic and thin-walled container 12 having an upwardly facing opening 13 covered by a perforate sheet or closure member 14.

The container 12, preferably fabricated from a moldable plastic, such as polystyrene, polyethylene, or the like, has an elongated bottom wall 16, a pair of sidewalls 17 and 18, and a pair of end walls 19 and 20. The sidewalls and end walls preferably diverge upwardly where they blend into an integral, outwardly extending flange 23 which encircles the opening 13 in the container. The sidewalls and end walls have upwardly diverging flutes 24 which add rigidity to said sidewalls and end walls without interfering with the nesting capability of a plurality of the containers 12 for shipping purposes.

The bottom wall 16 has a pair of intersecting, diagonal ridges or upwardly offset portions 25 and 26 which add rigidity to the bottom wall and provide a positive spacing between the bottom walls of adjacent, nested containers.

Figure 2:
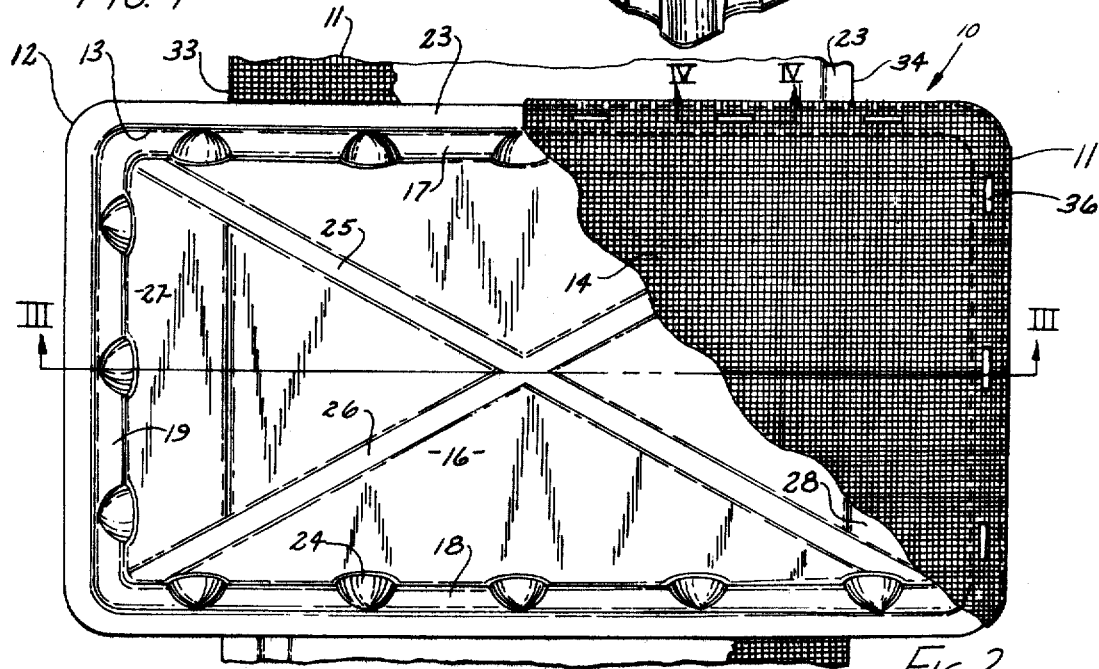
FIGURE 2 is a broken, top plan view of one compartment and part of another compartment of said enclosure structure.
Figure 3:
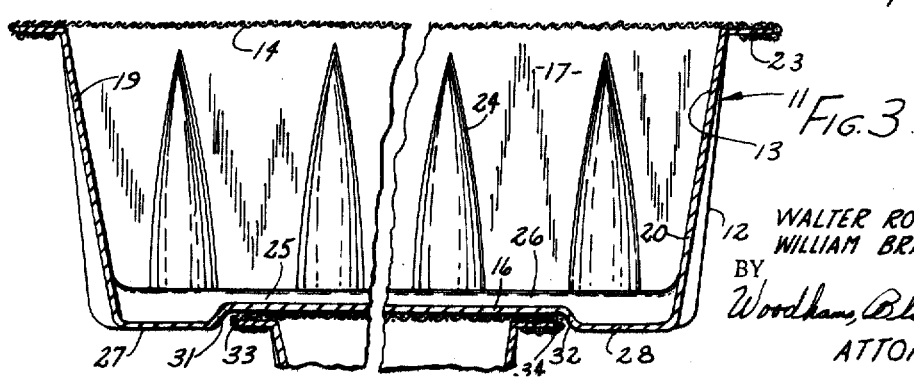
FIGURE 3 is a broken sectional view taken along the line III-III in FIGURE 2.

The bottom wall 16 has a pair of spaced, downwardly offset portions 27 and 28, which are located at the opposite ends of the bottom wall between the ridges 25 and 26, and which define a pair of opposed shoulders 31 and 32, as shown in FIGURE 3. The perpendicular distance between the opposite lateral edges 33 and 34 of the flange 23 is preferably slightly less than the distance between the shoulders 31 and 32 so that one container can be stacked upon another, as shown in FIGURES 1 and 2, with the flange 23 snugly disposed between the shoulders 31 and 32 to oppose endwise movement of the upper container with respect to the lower container. At the same time, substantial end portions of the opening in the upper end of the lower container remain unobstructed, as appearing in FIGURE 1.

The closure member 14 is fabricated from flexible perforate sheet material, such as fine mesh, nylon or metallic wire screen of the type conventionally used to block insects. Each closure member is preferably of length and width greater than the corresponding dimensions of the flange 23 so that the outer free edges of the closure member can be folded under the flange 23, as appearing in FIGURE 3.

When it becomes desirable to complete and use an enclosure unit 11, the closure member 14 is mounted upon the flange 23 and secured thereto by staples 36, or similar attachment devices, along all but a small corner portion of the closure member which remains unsecured until after the animals have been loaded into the enclosure unit. Then, the unsecured portion of the closure member, which provides an entry to the container near a corner thereof, is stapled in place and the enclosure unit is ready for shipment.

Since the enclosure units 11 are designed for the shipment of relatively small, lightweight animals, such as rodents, and since the sidewalls, end walls and bottom wall of each container 12 are relatively rigid, particularly by comparison to the lightness of their weight, a substantial number of enclosure units 11 can be stacked one upon another for storage and/or shipment, as shown in FIGURE 1, without danger of collapsing same. Large areas of the closure member 14 are unobstructed at the opposite ends thereof by the next enclosure unit supported thereon. Thus, adequate ventilation is provided through the enclosure unit so that suffocation of the animals is positively prevented. Due to the fact that the cross-sectional area of the opening 13 is substantially larger than that of the bottom wall 16, and due to the presence of the recesses provided by the flutes 24, adequate ventilation exists in each container, even where one enclosure unit 11 is stacked upon another in lengthwise aligned positions, instead of the transverse positions appearing in FIGURE 1. However, stacking in the aligned condition does not take advantage of the offsets in the bottom wall 16 whereby relative twisting and/or lengthwise movement of one container with respect to the next lower container is positively opposed. Clearly, such opposition to relative movement is important since it prevents unbalanced conditions which could cause the elevated units to fall.

After the enclosure unit 11 has reached its destination, the closure member 14 can be removed from the flange 23 by a conventional staple remover, by cutting or tearing the member 14, or any other convenient means, after which the closure member and container can be cleansed and sterilized for reuse. On the other hand, since both the container and its closure member can be fabricated at a relatively low cost, in the sizes contemplated for normal use, it will undoubtedly be less costly to scrap the enclosure unit 11 after the test animals have served their purposes. Meanwhile, the enclosures can be used as temporary cages.

In one contemplated use, the enclosure units are 21 inches long, 13 inches wide, 6 inches deep and they have an average wall thickness which does not materially exceed 1/32 of an inch. However, it will be recognized that smaller enclosure units can be fabricated according to the teachings of the invention, and that somewhat larger units can be provided by making appropriate adjustments in the wall thickness of the containers.

Although particular preferred embodiments of the apparatus appropriate for carrying out the methods and apparatus embodying the invention have been disclosed in detail hereinabove for illustrative purposes, it will be understood that variations and modifications of such disclosure which lie within the scope of the appended claims are fully contemplated.

We claim:

1. Enclosure structure having plural, superimposed compartments for animals, comprising:

plural, elongated and substantially identical container means fabricated from plastic material, each container means having sidewalls, end walls, a bottom wall, and an integral and outwardly projecting flange means extending completely around the upper free edges of the end walls and sidewalls, each bottom wall having a pair of downwardly projecting end portions, each being positioned adjacent a respective end wall and defining a pair of opposed shoulders which define a recess therebetween and are spaced from each other a distance slightly greater than the perpendicular distance between the remote edges of the flange means on said sidewalls whereby each container means can be supported upon and crosswise of another container means in a position opposing relative transverse movement without closing off the top of the lower container means;

plural perforate cover sheet means, each perforate sheet means being engageable with a said flange means throughout the length thereof for closing the interior of a container means for maintaining an animal therein while simultaneously permitting flow of air therethrough directly into the interior of the container means; and means adapted to removably secure said sheet means to said flange means.

2. Enclosure structure according to Claim 1, wherein said sidewalls and end walls of each container means are relatively thin, downwardly converging and have upwardly converging flutes so that said container means can be substantially completely nested one within another; and wherein each bottom wall has a pair of upwardly projecting ribs extending diagonally thereof and intersecting in the central portion of the bottom wall, said downwardly projecting end portions being between said ribs.

3. Enclosure structure according to Claim 1, wherein said cover sheet means comprises a perforated sheet of flexible mesh-like material, the edge of said sheet means being secured to said flange means over substantially the complete length thereof except for a corner portion of the sheet being free of attachment to said flange means, whereby the flexibility of the sheet permits the corner portion of the sheet to be deformed relative to the remaining portion of the sheet for permitting an animal to be loaded into the interior of the container means, whereupon the corner portion of the sheet is then secured to the flange means.

4. An enclosure structure for shipping animals, comprising:

container means fabricated from plastic material and having a pair of opposed sidewalls and a pair of opposed end walls with the sidewalls being spaced apart by a distance less than the spacing between the pair of end walls, a bottom wall integrally connected to the sidewalls and end walls whereby said sidewalls, end walls and bottom wall define an animal storage compartment;

said container means further having an outwardly projecting flange fixedly connected to and extending completely around the upper free edges of the end walls and sidewalls, and said bottom wall having a pair of downwardly projecting end portions with one of said end portions being positioned adjacent each of said end walls, the pair of downwardly projecting end portions providing a pair of opposed shoulders which define a recess therebetween, said recess having a width at least approximately equal to the perpendicular distance between the remote edges of the flanges projecting from the opposed sidewalls, whereby said container means can be stacked crosswise of another similar container means in a position opposing relative transverse movement therebetween;

cover means attachable to said container means for closing off the interior of the container means for positively maintaining an animal within said compartment, said cover means comprising a perforated sheet of material for permitting flow of air therethrough directly into the interior of the container means; and attachment means for removably securing said cover means to said flange.

5. An enclosure structure according to Claim 4 wherein said cover means comprises a sheet of flexible, mesh-like material for enabling said sheet to be secured to said flange over a major portion of the length thereof with a corner portion of said sheet remaining unattached to said flange to permit the corner portion to be deformed away from the container means for permitting an animal to be loaded into the compartment, whereupon the corner portion of the sheet can then be detachably secured to the flange.